Oct. 23, 1934.  E. W. DAVIS  1,977,873
LUBRICANT COMPRESSOR
Filed Sept. 29, 1930  2 Sheets-Sheet 1

Inventor:
Ernest W. Davis
By Williams,
Bradbury,
McCaleb & Hinkle
Attys.

Oct. 23, 1934.  E. W. DAVIS  1,977,873
LUBRICANT COMPRESSOR
Filed Sept. 29, 1930    2 Sheets-Sheet 2

Inventor:
Ernest W. Davis
By Williams, Bradbury,
McCaleb & Hinkle
Attys.

Patented Oct. 23, 1934

1,977,873

UNITED STATES PATENT OFFICE 1,977,873

LUBRICANT COMPRESSOR

Ernest W. Davis, Oak Park, Ill., assignor to Alemite Corporation, Chicago, Ill., a corporation of Delaware Application September 29, 1930, Serial No. 485,039

8 Claims. (Cl. 221—47.1)

My invention relates generally to lubricating apparatus, and more particularly to an improved form of power-operated lubricant compressor or grease gun.

One of the principal causes of difficulties in the operation of lubricant compressors is the formation of air pockets adjacent the inlet of the compression cylinder. If the air pocket is sufficiently large there is a possibility that only air will be drawn into the cylinder upon the suction stroke. This air will be compressed in the cylinder and expand upon the return stroke so that the air will prevent the piston from drawing in a charge of grease. One method of overcoming this difficulty is by the provision of low pressure compressing means for priming the high pressure cylinder. Such means, however, add materially to the cost of the apparatus and complicate its operation. In the lubricant compressor of my invention I utilize a portion of the driving means to prime the high pressure cylinder.

The object of my invention is, therefore, to provide an improved high pressure lubricant compressor in which improved means are incorporated to prime the high pressure cylinder.

A further object is to provide a power driven lubricant compressor in which the mechanical connection between the source of power and the pump is located partially in the passageway between the source of lubricant and the high pressure cylinder, and is operative to feed the lubricant from the source to the cylinder.

A further object is to provide an improved worm and worm wheel driven lubricant compressor in which the worm and worm wheel are positioned to aid in feeding the lubricant to the high pressure cylinder.

A further object is to provide improved means for priming high pressure cylinders of lubricant compressors in which a rotating part to which the lubricant adheres is moved continuously past the inlet port of the high pressure cylinder, thereby to force the lubricant into the said port.

Other objects will appear from the following description, reference being had to the accompanying drawings, in which.

Figure 1:
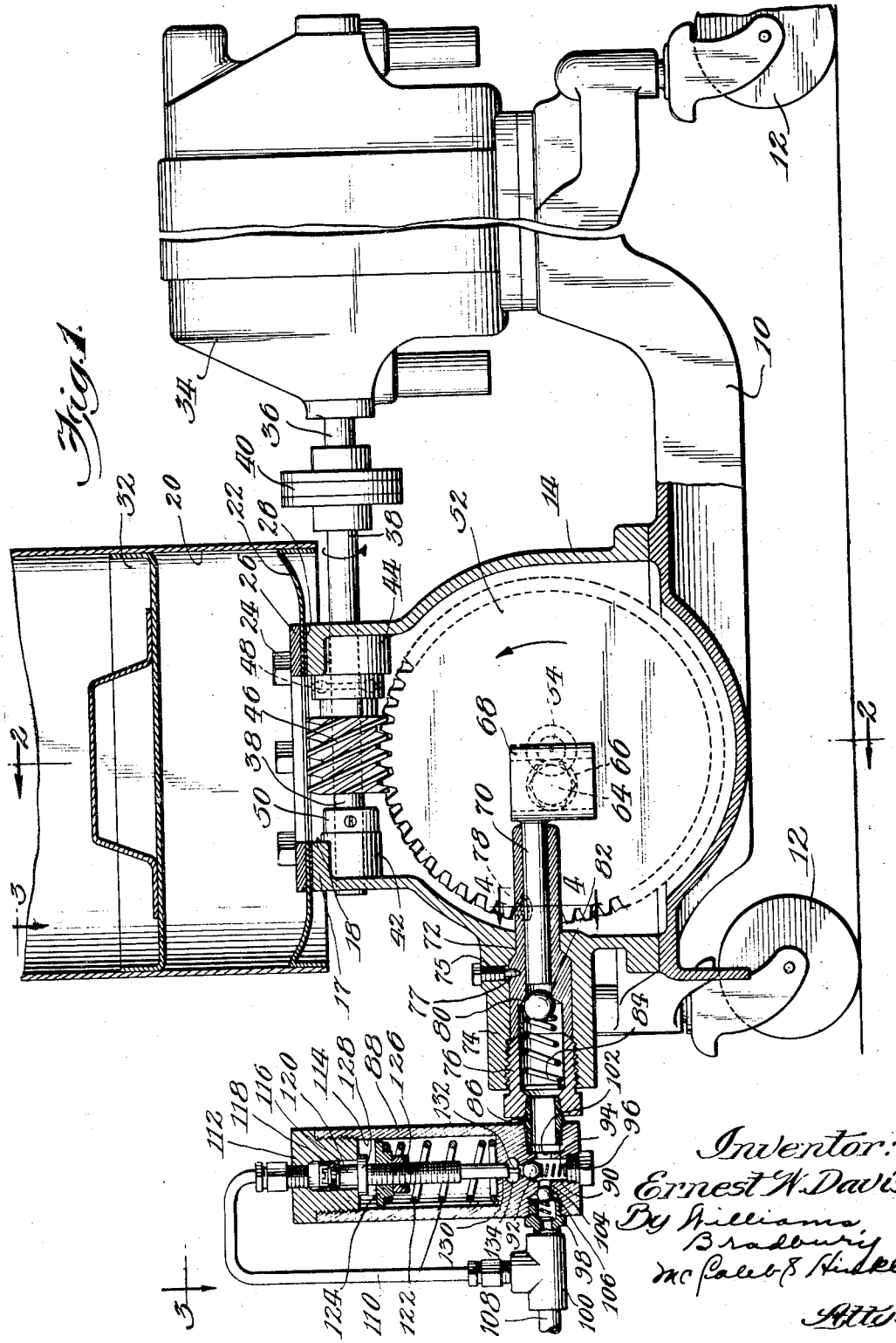
Fig. 1 is a central vertical sectional view of the compressor, the motor and a portion of the support being shown in elevation.
Figure 2:
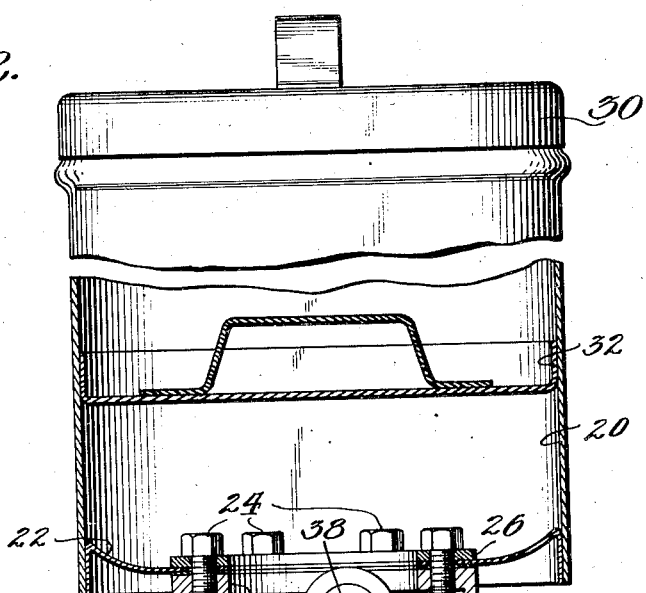
Fig. 2 is a vertical sectional view taken on the line 2—2 of Fig. 1.
Figure 3:
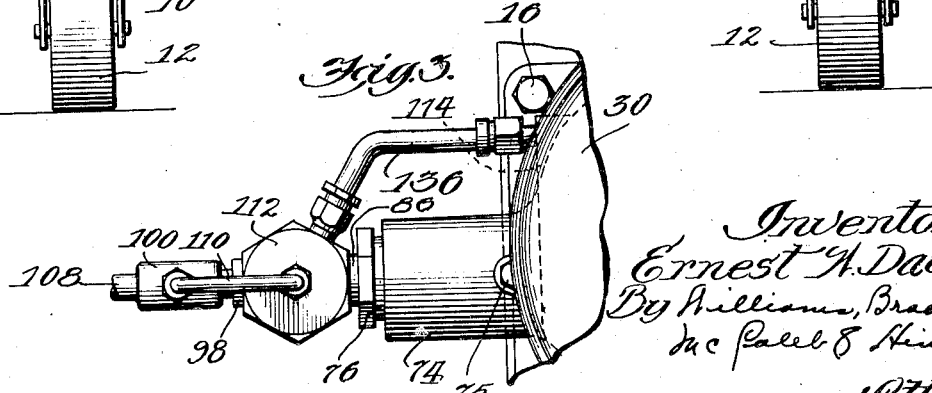
Fig. 3 is a fragmentary plan view showing the pressure controlling device.

As shown in Fig. 1, the lubricant compressor comprises a base 10 preferably supported by casters 12 so as to be readily portable. Suitably mounted upon the base 10 is a housing 14 which may be secured to the base by bolts or studs 16 (Fig. 3). The top of the housing 14 has an inwardly projecting flange 17 forming a substantially rectangular opening 18. A lubricant container 20 has its bottom 22 secured to the flange 16 by studs 24 which pass a clamping ring 26 and are threaded in the flange 16, a suitable gasket 28 being interposed between the bottom 22 and the flange 17 to seal the connection. The container 20 is preferably cylindrical in shape, the top being closed by a cover 30, and an atmospheric pressure operated follower 32 being provided to aid in forcing the grease through the opening 18. A motor 34 is suitably secured to the base 10 and has its armature shaft 36 connected to a worm shaft 38 by a flexible coupling 40. The shaft 38 is rotatable in bearings 42 and 44 formed by inwardly projecting bosses of the casing 14 and has a worm 46 secured thereto. The hub of the worm bears against a thrust bearing 48 which may be of any suitable construction. A collar 50 is rigidly secured to the shaft 38 to prevent axial movement of the latter.

The worm 46 meshes with a worm wheel 52 which is mounted for free rotation upon the inner end of a stud 54 which has a portion 56 threaded in a boss 58 which projects inwardly and is formed integrally with the housing 14. A lock nut 60 permits adjustment of the position of the stud 56 and is used to lock the stud in adjusted position. The end of the stud 54 is of reduced diameter so that a bearing surface 62 is formed on the stud to take the axial thrust of the worm wheel.

Figure 4:
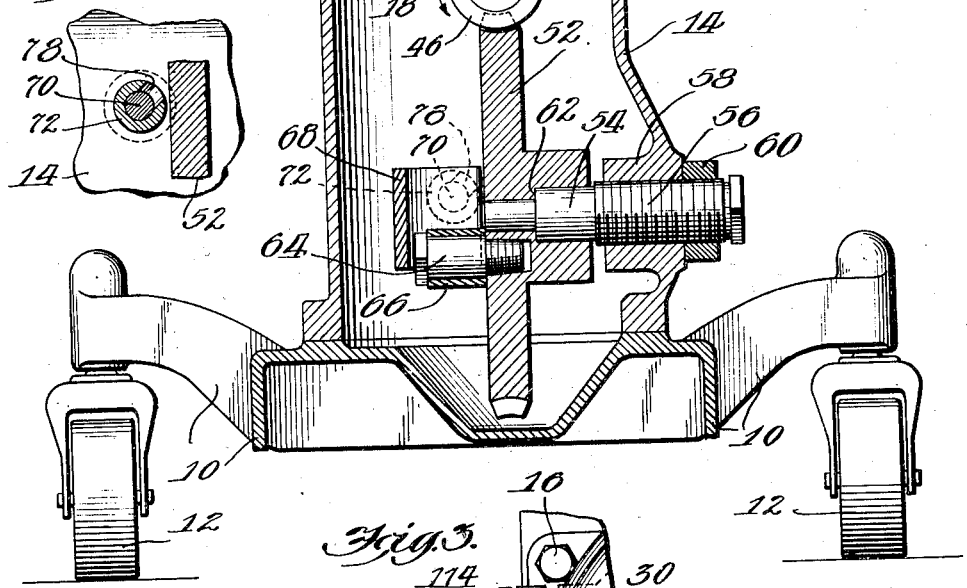
Fig. 4 is a fragmentary transverse sectional view taken on the line 4—4 of Fig. 1.

The pin 64 has its end threaded in the worm wheel 52 eccentric of the latter and carries a hardened roller 66, the latter being engageable with the walls of a cross head 68 which is secured to or formed integrally with a plunger 70. The cross head is generally U-shaped in horizontal cross-section and has its upper and lower ends open so that any foreign matter in the guide will be forced therefrom and not permanently lodged therein. The plunger 70 is reciprocable in a cylinder 72, which is preferably of a relatively hard metal, and is secured in a boss 74 formed on the housing 14 by a bushing 76 threaded in the end of the boss. The ends of the cylinder and bushing are preferably complementally beveled so that a lubricant seal will be obtained at their juncture. The cylinder 72 is prevented from rotating in the boss 74 by a set screw 75 threaded in the boss and having a point 77 projecting into the cylinder. The cylinder 72 has an inlet port 78 intermediate the ends thereof, the port facing upward and toward the worm wheel 52, as best illustrated in Fig. 4. The outer end of the cylinder has a valve seat 80 formed therein for a ball check valve 82 which is pressed against the seat by a spring 84 which seats in the bushing 76. A pipe nipple 86 connects the bushing with the body 88 of a pressure relief device shown in Fig. 1.

The body of the pressure relief device has a small diameter vertical passageway 90 formed in the lower end thereof, the upper end of this passageway being normally closed by a ball valve 92 held against its seat by a spring 94. The lower end of the spring rests upon a plug 96 which closes the end of the passageway 90. A fitting 98 is threaded in the body 88 opposite the pipe nipple 86 and in a T 100. Ports 102 and 104 connect the passageway 90 with the nipple 86 and fitting 98, respectively, the port 104 being normally closed by a spring pressed ball check valve 106. A discharge conduit 108 is connected to the T 100 and is adapted to convey the lubricant to the part to be lubricated and in practice usually comprises a flexible hose having a suitable attachment at its end by which connections may be successively made to a plurality of lubricant receiving fittings carried by the parts to be lubricated. A pipe 110 connects the T 100 with a cap 112 threaded in the upper end of a bore 114 formed in the body 88. The cap has a pressure cylinder 116 formed therein. A piston comprising a cup leather 118 suitably secured to a piston stem 120 is reciprocable in the cylinder 116 and normally held in its upper position by a spring 122 which engages a collar 124 threaded on the stem 120, the collar being locked in position by nut 126. Upward movement of the stem 120 is limited by the engagement of a flange 128 against the lower end of the cap 112. The lower end of the stem 120 is cylindrical in shape and is guided in a drilled hole 130 formed in the body 88. The extremity 132 of the stem is of reduced diameter and is adapted to engage the ball check valve 92 and force the latter from its seat when the stem is moved downwardly. A passageway 134 is formed in the body communicating with the drilled hole 130 and being connected by a conduit 136 (Fig. 3) with the housing 14.

The motor operates in the direction indicated by the arrows so that grease in the container 20 will, because of its adhesion, be drawn by the the worm 46 and deposited on the side of the worm wheel 52, thus at all times forming a ridge of grease on the side of said worm wheel. As the worm wheel 52 rotates in the direction indicated by the arrow in Fig. 1, this grease will be scraped from the worm wheel by the cylinder 72 and will pile up around the inlet port 78. As the worm wheel rotates it will, of course, reciprocate the plunger 70. Due to the fact that the grease is piled around the inlet opening 78, a full charge of grease will be drawn into the cylinder whenever the inlet port is uncovered by the plunger, this grease being forced past the check valve 82 upon the discharge stroke of the plunger.

The lubricant is forced through the ports 102, 104, past check valve 106, into the conduit 108, and thence to the parts to be lubricated. Since it is desirable to run the motor 34 continuously rather than to start and stop it each time the lubricant under pressure is required, I have provided an automatically operable by-pass to permit lubricant to be by-passed from the passageway 90 to the housing 14 whenever the pressure in the discharge conduit 108 exceeds a predetermined maximum. Thus when the lubricant is not being discharged through the conduit 108, the pressure in said conduit will build up rapidly and lubricant forced under pressure through the pipe 110 into the cylinder 116. When the pressure in the cylinder 116 builds up sufficiently to overcome the compression of the spring 122 the piston 118 will be forced downwardly until the extremity 132 of the stem 120 engages the ball valve 92 and forces the latter from its seat, whereupon a by-pass will be opened from the discharge of the pump through the port 102, passageway 90, passageway 134, conduit 136, back to the housing 14. It will be noted that when lubricant is thus being by-passed the only resistance to its flow is that offered by the discharge check valve 82. The load on the motor is thus considerably relieved and power consumption correspondingly reduced.

With the apparatus of my invention it will be noted that substantially irrespective of the number and size of air pockets contained in the grease, grease will at all times be piled over the inlet port of the high pressure cylinder so that a supply of grease will always be located in readiness to prime the cylinder. The movement of the worm wheel past the inlet port also slightly aids in forcing the grease into the inlet port by the pressure which is exerted on the grease as it is scraped off the worm wheel by the cylinder. It will be noted that the worm and worm wheel are the usual means utilized for connecting a motor to reciprocate the plunger and that merely by locating these parts within the housing in a novel position relative to the inlet port of the cylinder I have provided a highly desirable means for priming the high pressure cylinder without materially increasing the cost of the apparatus.

The invention is capable of wide variation within equivalent limits and I contemplate such variation as may be desirable or useful in the particular adaptation of the invention shown, or in its adaptation to other apparatus. I do not restrict myself in any unessential particulars, but what I claim and desire to secure by Letters Patent is:

1. A power-operated lubricant compressor comprising a lubricant container, a high pressure cylinder having an inlet port in the wall thereof, a plunger reciprocable in said cylinder, and power-driven means to reciprocate said plunger, said last named means including a disc normally rotating adjacent said inlet port whereby lubricant adhering to said disc will be forced into said inlet port.

2. A high pressure lubricant compressor comprising a high pressure compressing means, an inlet port in said means, a lubricant reservoir for supplying lubricant to said compressing means, power means for operating said high pressure compressing means, and a mechanical drive between said power means and said high pressure compressing means, said drive including a member positioned sufficiently close to said inlet port during the normal operation of the apparatus to feed lubricant into said port.

3. A lubricant compressor comprising a cylinder having an inlet port therein, a plunger reciprocable in said cylinder, and a worm wheel connected to said plunger for reciprocating the latter, said worm wheel lying in the path of flow of lubricant from the source to said inlet port and adapted to scrape lubricant adhering to its side into said inlet port.

4. A power-operated lubricant compressor comprising a lubricant container, a cylinder having an inlet port, a piston reciprocable in said cylinder to discharge lubricant therefrom, and means to reciprocate said piston, said last named means including a member moved adjacent said inlet port incident to the normal operation of the compressor whereby lubricant adhering to said member will be forced into said inlet port.

5. In a device of the class described, the combination of a lubricant container having an opening therein, a power-driven worm located adjacent said opening, a worm wheel driven by said worm, a plunger connected to said worm wheel to be reciprocated thereby, and a cylinder for said plunger, said cylinder having an inlet port adjacent said worm wheel, whereby lubricant adhering to said worm will be transferred to said worm wheel and scraped from the latter by the portion of said cylinder adjacent said inlet port.

6. A viscous material pumping apparatus comprising a pumping means having an inlet port, a source of material to be pumped in communication with said inlet port, a source of power, and mechanical power transmission means connecting said power source with said pumping means and located in the path of communication between said material source and said pumping means, said power transmission means having a part moved past and closely adjacent said inlet port in the normal operation of the apparatus whereby material adhering to said part will be deposited at said inlet port.

7. In an apparatus for handling viscous materials, the combination of a pump having an inlet port, and means to supply the viscous material to said pump comprising an element moved past the inlet port during the normal operation of the apparatus and adapted thereby to feed the viscous material adhering thereto into said inlet port.

8. In an apparatus for handling viscous materials, the combination of a pump mechanism having an inlet port, power means for operating said pump, and means for transmitting power from said power means to said pump comprising an element normally moved in the path of flow of the viscous material to said inlet port and closely adjacent to said port, thereby to supply material adhering thereto to said port.

ERNEST W. DAVIS.